(12) United States Patent
Hirose et al.

(10) Patent No.: US 7,706,129 B2
(45) Date of Patent: Apr. 27, 2010

(54) ELECTRIC DOUBLE-LAYER CAPACITOR AND METHOD FOR MANUFACTURING THE SAME

(75) Inventors: Eri Hirose, Kyoto (JP); Yasuyuki Ito, Osaka (JP); Satomi Onishi, Osaka (JP); Mitsuru Iwai, Osaka (JP); Takumi Yamaguchi, Kyoto (JP); Ichiro Aoki, Osaka (JP); Kouji Moriyama, Kyoto (JP); Yoshiki Hashimoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/300,619

(22) PCT Filed: May 25, 2007

(86) PCT No.: PCT/JP2007/060685

§ 371 (c)(1),
(2), (4) Date: Nov. 12, 2008

(87) PCT Pub. No.: WO2007/139008

PCT Pub. Date: Dec. 6, 2007

(65) Prior Publication Data

US 2009/0122467 A1    May 14, 2009

(30) Foreign Application Priority Data

May 29, 2006  (JP) .............................. 2006-148065
May 29, 2006  (JP) .............................. 2006-148066

(51) Int. Cl.
*H01G 9/00* (2006.01)
(52) U.S. Cl. ..................... 361/502; 361/503; 361/504; 361/508; 361/512; 361/525
(58) Field of Classification Search ................. 361/502, 361/503–504, 508–512, 516–519, 523–528, 361/529, 303–305
See application file for complete search history.

(56) References Cited

U.S. PATENT DOCUMENTS

| | | | | |
|---|---|---|---|---|
| 6,335,857 B1 * | 1/2002 | Takimoto et al. | ............ | 361/502 |
| 6,426,862 B1 * | 7/2002 | Vasechkin et al. | ............ | 361/502 |
| 6,426,865 B2 * | 7/2002 | Kasahara et al. | ............ | 361/512 |
| 6,614,646 B2 * | 9/2003 | Bogaki et al. | ............ | 361/502 |
| 6,697,249 B2 * | 2/2004 | Maletin et al. | ............ | 361/502 |
| 7,271,994 B2 * | 9/2007 | Stemen et al. | ............ | 361/508 |
| 7,511,943 B2 * | 3/2009 | Fife et al. | ............ | 361/516 |

FOREIGN PATENT DOCUMENTS

| | | |
|---|---|---|
| JP | 08-083738 | 3/1996 |
| JP | 10-270293 | 10/1998 |
| JP | 2004-221179 | 8/2004 |
| JP | 2005-340610 | 12/2005 |
| WO | 2005-069321 | 7/2005 |

OTHER PUBLICATIONS

International Search Report for PCT/JP2007/060685, Aug. 2, 2007.

* cited by examiner

*Primary Examiner*—Nguyen T Ha
(74) *Attorney, Agent, or Firm*—Pearne & Gordon LLP

(57) ABSTRACT

In an electric double-layer capacitor, resistance of a polarizable electrode layer is reduced and gas generation inside a case is suppressed in an attempt to improve reliability. On that account, an electric double-layer capacitor is provided, which is obtained by housing in a case, together with a driving electrolyte, a capacitor element wound with a separator interposed between electrodes being paired anode and cathode electrodes in each of which polarizable electrode layers are formed on and lead wires are fixed to both sides of a current collector made of metallic foil, such that the polarizable electrode layers are opposed to each other. Further, an electric double-layer capacitor is provided in which the lead wire is fixed to a polarizable-electrode-layer-removed section on the electrode where the polarizable electrode layer has been removed, and an area of the polarizable-electrode-layer-removed section is not smaller than 1 and not larger than 2.0 when a project area of a portion where the lead wire is connected with the current collector is set to 1.

7 Claims, 8 Drawing Sheets

ELECTRIC DOUBLE-LAYER CAPACITOR AND METHOD FOR MANUFACTURING THE SAME

TECHNICAL FIELD

The present invention relates to an electric double-layer capacitor used in various electric equipments and a method for manufacturing the same, and particularly relates to an electric double-layer capacitor having excellent low-resistance and low-temperature characteristics and long-term reliability, and a method for manufacturing the same.

BACKGROUND ART

FIG. 9 is a partially broken away perspective view showing a configuration of a conventional electric double-layer capacitor of this kind. In FIG. 9, capacitor element 121 is configured by winding anode electrode 122 and cathode electrode 123 in a state where separator 124 is interposed therebetween.

Further, anode electrode 122 and cathode electrode 123 are configured by respectively forming polarizable electrode layers 126 on both sides (the rear side is not shown) of current collector 125 made of metallic foil. Moreover, anode electrode 122 and cathode electrode 123 are respectively connected with anode lead wire 127 and cathode lead wire 128.

Capacitor element 121 as thus configured is impregnated with a driving electrolyte (not shown) and then inserted into bottomed cylindrical case 129, and after rubber-made sealing member 130 having holes through which anode lead wire 127 and cathode lead wire 128 are inserted is arranged on an opening of case 129, a periphery of the opening of case 129 is inwardly drawn and an opening end of case 129 is also curled, to seal the opening.

For the purpose of improvement in efficiency as the electrodes, polarizable electrode layers 126 are formed in layer shape on both sides of current collector 125. In fixing anode lead wire 127 and cathode lead wire 128 for electrical pulling from the electrodes, since contact resistance would be high if the lead wire is fixed from the top of polarizable electrode layer 126, current collector 125 is conventionally exposed by scraping away polarizable electrode layer 126 in positions where anode lead wire 127 and cathode lead wire 128 are fixed or by some other method. Namely, in order to make anode lead wire 127 and cathode lead wire 128 favorably connected with the metallic foil as current collector 125 for reducing a resistance component, polarizable electrode layer 126 in the connected portion is partially removed to expose current collector 125, and the lead wire is then connected thereto.

It is to be noted that as related art document information relevant to the invention of this application, for example, Patent Document 1 and Patent Document 2 are known.

However, in the configuration of the above-mentioned conventional electric double-layer capacitor, especially in cathode polarizable electrode layer 126, when the exposed portion of current collector 125 is opposed to polarizable electrode layer 126 through separator 124 at the time of fixing cathode lead wire 128, overacidity of anions in the electrolyte may exert to degrade or erode the separator.

Further, in the above-mentioned conventional electric double-layer capacitor, at the time of connecting anode lead wire 127 to the anode electrode 122 (the same applies to cathode electrode 123), polarizable electrode layer 126 in the connected portion is partially removed for the purpose of making favorable connection with the metallic foil as current collector 125 to reduce the resistance component. The method of removing polarizable electrode layer 126 is forcibly scraping away the electrode layer by use of a rotating brush or the like, and an area of the electrode layer is removed considerably larger than an area of the connected portion of the lead wire to be connected in view of problems concerning processing accuracy and assembly, and the like. Hence, with the lead wire in the state of being connected to each electrode, on the periphery of the lead wire, polarizable electrode layer 126 does not exist and a portion where current collector 125 is exposed exists.

However, when a requirement for ensuring a range (70° C., 2.7 V), which exceeds a range (60° C., 2.3 V or less) required of the conventional electric double-layer capacitor to ensure, is intended to be met, there is a problem as follows due to occurrence of such an exposed portion of current collector 125.

Namely, when a high voltage is applied to use the capacitor for a long period of time, the driving electrolyte reacts between the exposed portion of current collector 125 of cathode electrode 123 and polarizable electrode layer 126 of anode electrode 122 which is opposed to the exposed portion through separator 124, and electrolytic anions $BF_4^-$, $PF_6^-$ and the like are drawn to the anode side, to acidify the peripheral portion thereof, thereby causing deterioration in separator 124. Hence there is a problem of consequently causing not only deterioration in characteristic but also occurrence of gas generation and an increase in inner pressure.

It is possible to solve such a problem all at once by forming polarizable electrode layer 126 on the lead wire and exposed portion of current collector 125 after connection of the lead wire to each electrode, but adding such a process forces a large burden in terms of cost.

[Patent Document 1] Unexamined Japanese Patent Publication No. H08-83738

[Patent Document 2] Unexamined Japanese Patent Publication No. H10-270293

DISCLOSURE OF THE INVENTION

The present invention is an electric double-layer capacitor excellent in long-term reliability which solves the conventional problem as described above, thereby suppressing gas generation in the inside thereof.

Therefore, the present invention is an electric double-layer capacitor wherein, in an electrode in which polarizable electrode layers are formed on and lead wires are fixed to both sides of a current collector made of metallic foil, at the time of fixing the lead wire to a polarizable-electrode-layer-removed section on the electrode where the polarizable electrode layer has been removed, a project area of a portion where the lead wire is connected with the current collector is 1, and an area of the polarizable-electrode-layer-removed section is not smaller than 1 and not larger than 2.0.

In the electric double-layer capacitor of the present invention, the polarizable electrode layer is formed on both sides of the current collector, and further, the polarizable-electrode-layer-removed section as the exposed portion of the current collector on the periphery of the position where the lead wire is fixed is formed with the minimum required size, whereby it is possible to provide an electric double-layer capacitor and a manufacturing method thereof, the capacitor being excellent in long-term reliability and having electrodes where contact resistance is small and gas generation is suppressed while manufacturing cost is suppressed.

Further, the present invention is a method of producing an anode electrode and a cathode electrode such that, after formation of the polarizable electrode layers on both sides of the current collector, part of this polarizable electrode layer is removed and the lead wire is connected to a portion where part of the polarizable electrode layer has been removed. Moreover, as a method of removing part of the polarizable electrode layer, a heat metal plate in shape corresponding to a shape of the removed portion is pressed onto the polarizable electrode layer and heated, to scatter binder components in the polarizable electrode layer, and thereafter, the polarizable electrode layer in this heated portion is mechanically scraped away by use of a rotating brush. Further, as an area of part of the polarizable electrode layer which is removed, an area of the polarizable electrode layer is removed one time to twice as large as an area of the connected portion of the lead wire to be connected to the removed portion.

The method for manufacturing an electric double-layer capacitor according to the present invention can make removal of the polarizable electrode layer extremely easier than the method of scattering the binder components in the polarizable electrode layer and then scraping away the polarizable electrode layer by use of the brush. In addition to that, since the method makes it possible to remove only the portion required to be removed with accuracy, the polarizable electrode layer only with the minimum required area is removed and the lead wire is connected thereto so that the unnecessary exposed portion of the current collector can be extremely small. Hence there can be extremely few cases where $BF_4^-$, $PF_6^-$ and the like as electrolytic anions having generated in the exposed portion of the current collector of the cathode electrode are concentrated to be acidified. This allows suppression of deterioration in separator and thereby allows suppression of gas generation which occurs through an electrochemical reaction, an increase in resistance and a decrease in capacitance, so that an electric double-layer capacitor with small characteristic deterioration and high reliability can be stably manufactured.

| EXPLANATION OF REFERENTIAL MARKS | |
|---|---|
| 1 | Capacitor element |
| 2 | Lead wire |
| 2a | Projected portion |
| 3 | Current collector |
| 4 | Polarizable electrode layer |
| 5 | Separator |
| 6 | Polarizable-electrode-layer-removed section |
| 7 | Sealing member |
| 8 | Case |
| 9 | Anode electrode |
| 10 | Cathode electrode |
| 11 | Anion |
| 12 | Cation |

PREFERRED EMBODIMENTS FOR CARRYING OUT OF THE INVENTION

Embodiment 1

In the following, Embodiment 1 of the present invention is described with reference to FIGS. 1 to 5.

Figure 1:
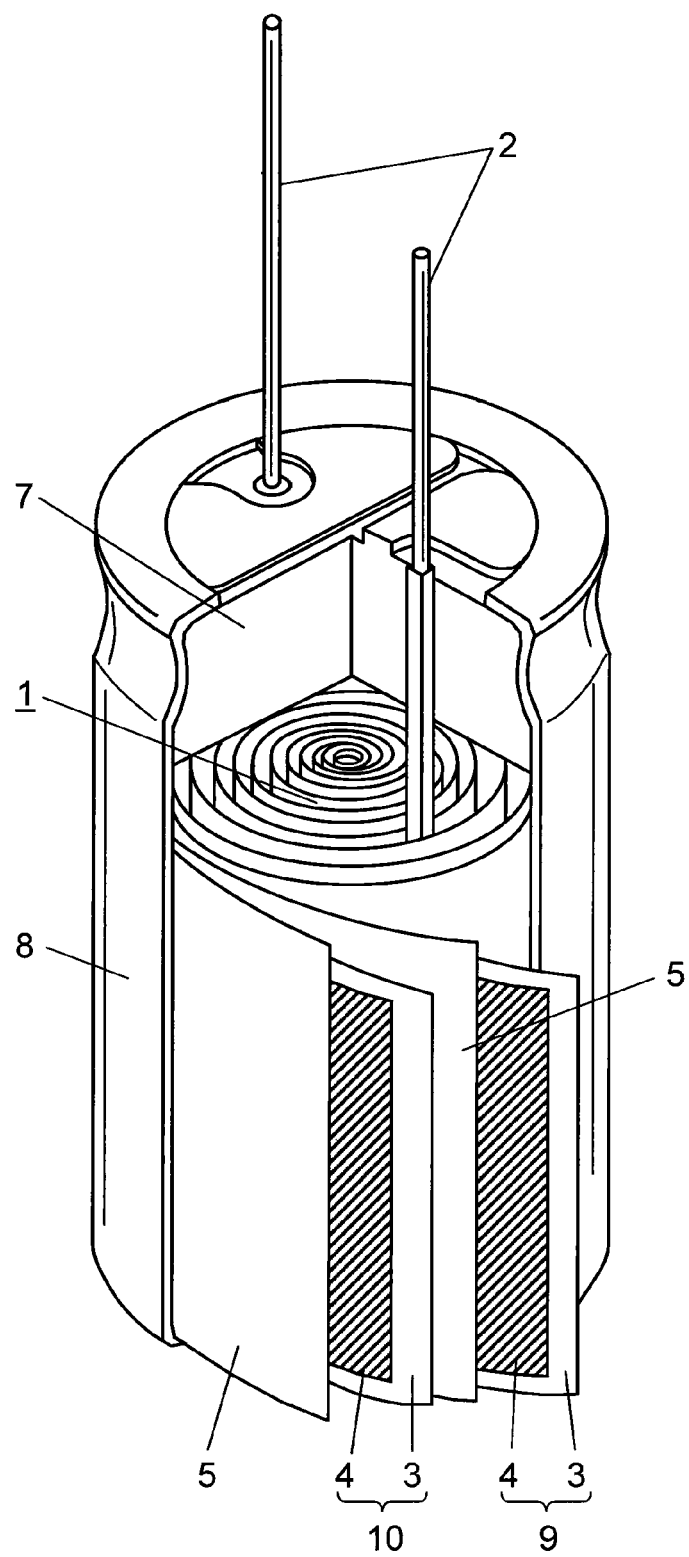
FIG. 1 is a partially broken away perspective view of an electric double-layer capacitor according to Embodiment 1 of the present invention.

FIG. 1 is a partially broken away perspective view showing a configuration of an electric double-layer capacitor according to present Embodiment 1.

In FIG. 1, capacitor element 1 is configured such that polarizable electrode layers 4 are formed on both sides of each of two current collectors 3 made of metallic foil such as aluminum, to which lead wires 2 are connected, to give anode electrode 9 and cathode electrode 10, and these electrodes are wound with separator 5 for preventing a short circuit interposed therebetween.

It is to be noted that respective pairs of lead wires 2 and separators 5 are prepared so as to correspond to the anode and cathode electrodes.

This capacitor element 1 is impregnated with a driving electrolyte (not shown), and as shown in FIG. 1, rubber-made sealing member 7 provided with holes through which lead wires 2 are inserted is fitted onto the top end of capacitor element 1, capacitor element 1 is housed into bottomed cylindrical case 8 made of aluminum, and an opening of case 8 is drawn to compress sealing member 7 so as to seal case 8.

Further, polarizable electrode layer 4 is configured of a kneaded matter of an activated carbon powder, carbon black and a binder, and as the activated carbon powder, a powder prepared by activating a raw material based upon a wood powder, a coconut shell, a phenol resin, petroleum coke, coal coke, or pitch is used. Further, as the binder, a mixture of water-soluble polytetrafluoroethylene and carboxymethyl-cellulose (hereinafter referred to as CMC) is used.

As a solvent of the driving electrolyte used is a mixture of one or more than one kinds of any of propylene carbonate, γ-butyrolactone, ethylene carbonate, sulfolane, acetonitrile, dimethyl carbonate, diethyl carbonate, and methyl ethyl carbonate. Further, as electrolytic cations, quaternary ammonium, quaternary phosphonium or imidazolium salt is used, and as electrolytic anions, $BF_4^-$, $PF_6^-$, $ClO_4^-$, $CF_3SO_3^-$, or $N(CF_3SO_2)_2^-$ is used.

Figure 2A:
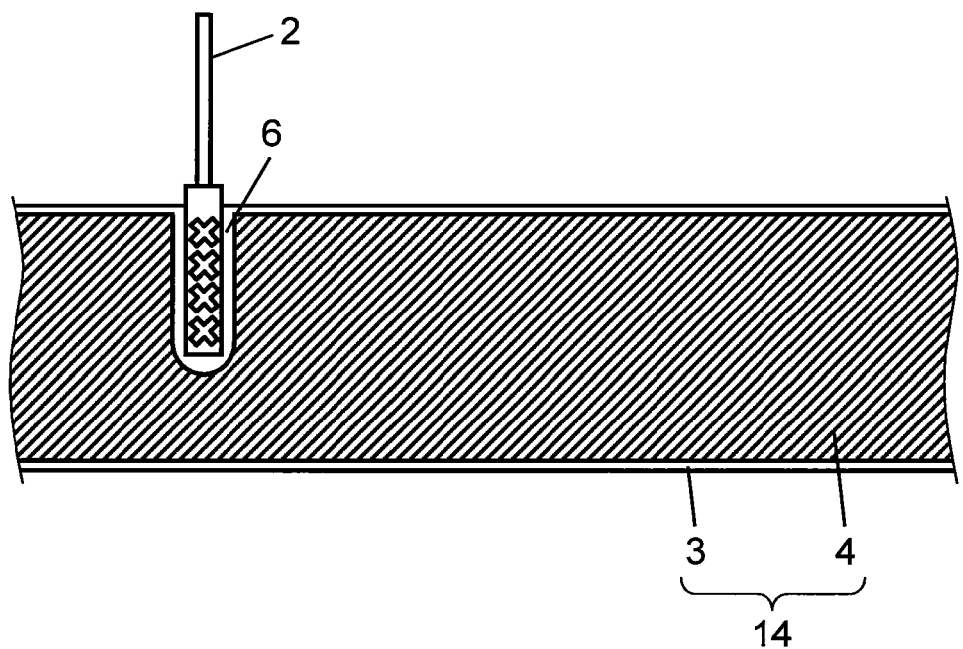
FIG. 2A is a plan view showing a front side of an electrode in the electric double-layer capacitor according to Embodiment 1 of the present invention.
Figure 2B:
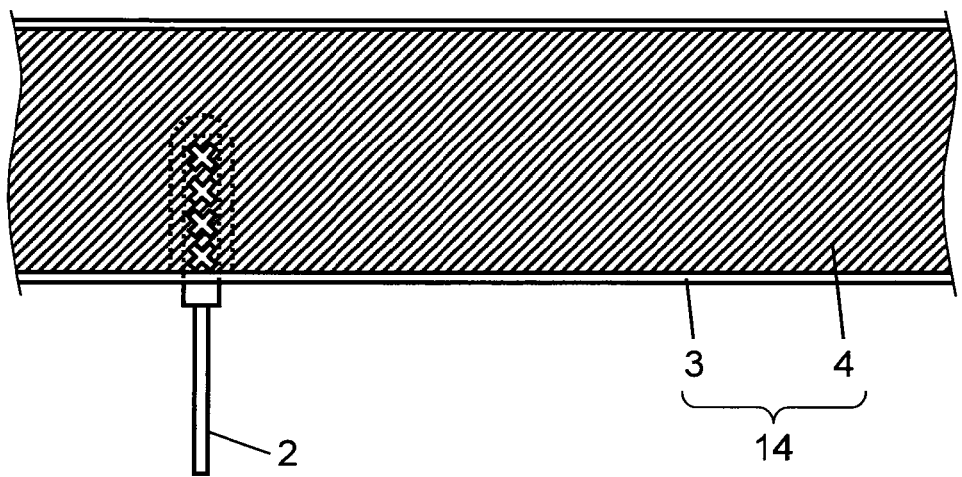
FIG. 2B is a plan view showing a rear side of the electrode in the electric double-layer capacitor according to Embodiment 1 of the present invention.

FIGS. 2A and 2B are plan views showing the front and rear sides of the electrode used in the same electric double-layer capacitor. FIG. 2B is obtained by turning over FIG. 2A in a vertical direction.

In FIGS. 2A and 2B, polarizable electrode layers 4 are formed on both sides of current collector 3 in electrode 14, and polarizable-electrode-layer-removed section 6 where current collector 3 is exposed is provided by partially scraping away a portion corresponding to a lead wire 2 fixed position, and to this polarizable-electrode-layer-removed section 6, lead wire 2 is fixed by caulking joint or the like. Polarizable electrode layer 4 in the portion corresponding to the fixed position of lead wire 2 is removed here because, if lead wire 2 is directly fixed from the top of electrode 14 where polarizable electrode layer 4 is formed, contact resistance between polarizable electrode layer 4 and lead wire 2 increases when a current flows from lead wire 2 to electrode 14, resulting in a large loss during charge/discharge of the capacitor, or the like.

Figure 3A:
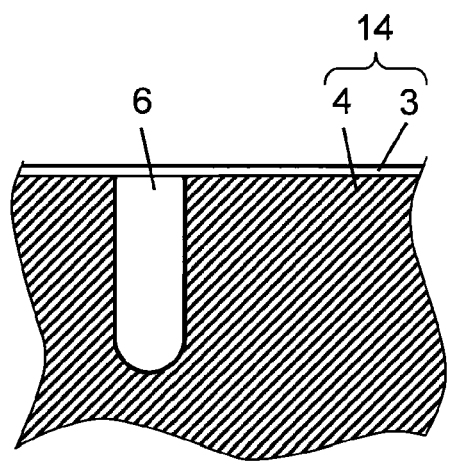
FIG. 3A is an expanded plan view of a polarizable-electrode-layer-removed section in the electric double-layer capacitor according to Embodiment 1 of the present invention.
Figure 3B:
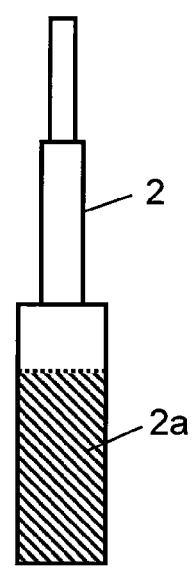
FIG. 3B is an expanded plan view of a lead wire in the electric double-layer capacitor according to Embodiment 1 of the present invention.

FIG. 3A is an expanded plan view of polarizable-electrode-layer-removed section 6, and FIG. 3B is an expanded plan view of lead wire 2. A project section 2a as a portion overlapping electrode 14 at the time of fixing lead wire 2 to electrode 14 is shown by hatching. When an area of the project section 2a is set to 1, an area of polarizable-electrode-layer-removed section 6 is set to not smaller than 1 and not larger than 2.0.

As thus described, it is one of technical characteristics of the present invention to provide polarizable-electrode-layer-removed section 6 in electrode 14 and set the area of polarizable-electrode-layer-removed section 6 to not smaller than 1 and not larger than 2.0 when the area of project section 2a of lead wire 2 is set to 1, whereby it is possible to suppress the resistance between lead wire 2 and current collector 3, and also suppress gas generation from the periphery of the fixed portion of lead wire 2.

The capacitor has conventionally been used on conditions of not larger than 2.3 V and 60° C., for example. However, according to the embodiment of the present embodiment, it is possible to suppress an increase in inner pressure due to gas generation caused by degradation or erosion of the separator on the periphery of the fixed portion of lead wire 2 as a phenomenon that appears more significantly on conditions of 2.7 V and 70° C.

Figure 4:
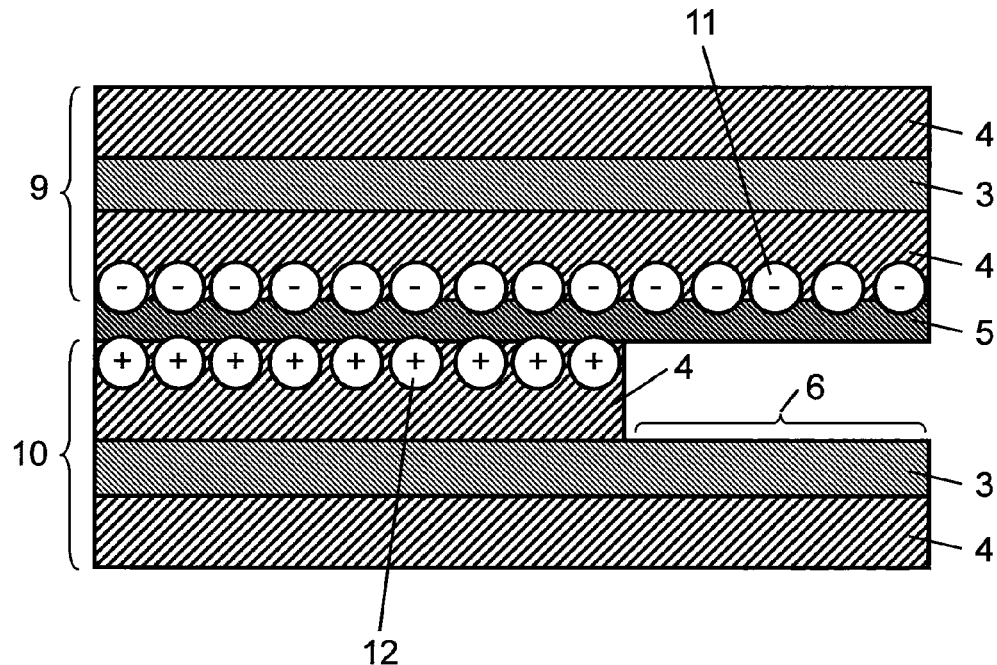
FIG. 4 is a sectional view schematically representing anode and cathode electrodes in the electric double-layer capacitor according to Embodiment 1 of the present invention.

Gas generation on the periphery of the fixed portion of lead wire 2 is described with reference to FIG. 4. FIG. 4 is a schematic view representing a condition in which polarizable electrode layers 4 are opposed to each other with separator 5 interposed therebetween in the anode and cathode electrodes in the electric double-layer capacitor according to Embodiment 1.

In FIG. 4, anode electrode 9 in which polarizable electrodes layers 4 are formed on both sides of current collector 3 is opposed to cathode electrode 10 with separator 5 interposed therebetween. In cathode electrode 10, polarizable-electrode-layer-removed section 6 on the periphery of the fixed portion of lead wire 2 is formed.

When this electric double-layer capacitor is charged, anions 11 in the electrolyte inside case 8 or impregnated in separator 5 are concentrated on the side of anode electrode 9, and cations 12 also in the electrolyte are concentrated on the side of cathode electrode 10. At this time, anions 11 and cations 12, which are opposed to each other with separator 5 interposed therebetween, are electrically stable, but anions 11 opposed to polarizable-electrode-layer-removed section 6 reacts with moisture or the like to generate overacidity derived from anions 11.

This overacidity derived from anions 11 can be one of causes for degradation or erosion of separator 5 which induces gas generation.

In particular, in a case where separator 5 is made of cellulose or the like, the effect of suppressing gas generation is more significant.

Conventionally, in FIG. 2A, polarizable-electrode-layer-removed section 6 is formed over the whole width as a vertical direction of current collector 3. This is because, since polarizable electrode layer 4 is provided on current collector 3 to give cathode electrode 10 and lead wire 2 is then fixed thereto, the removed section is set to a size not smaller than the width of polarizable electrode layer 4 with the aim of improving productivity in the process of removing polarizable electrode layer 4.

Therefore, since polarizable-electrode-layer-removed section 6 is formed with a size larger than necessary, the area of above-mentioned polarizable-electrode-layer-removed section 6 not opposed to polarizable electrode layer 4 with separator 5 interposed therebetween becomes large, thereby inducing gas generation. However, according to the embodiment of the present invention, the length of this portion is set to an adequately size smaller than the width of cathode electrode 10, and it is thereby possible to suppress the resistance between lead wire 2 and current collector 3, and also suppress gas generation from this portion.

It is to be noted that in formation of polarizable-electrode-layer-removed section 6, it is possible to press a heated metal or the like onto polarizable electrode layer 4 for partially heating polarizable electrode layer 4, and then scrape away polarizable electrode layer 4 by use of a roller brush or the like, so as to form polarizable-electrode-layer-removed section 6. With such formation, the top of polarizable-electrode-layer-removed section 6 has a roundish shape, as shown in FIG. 3A.

It is to be noted that, when polarizable-electrode-layer-removed section 6 is provided and the project area of project section 2a as a portion where lead wire 2 is connected with cathode electrode 10 is set to 1, the area of polarizable-electrode-layer-removed section 6 only on the side of cathode electrode 10 may be set to not smaller 1 and not larger than 2.0. However, applying the same to polarizable-electrode-layer-removed section 6 on the side of anode electrode 9 allows suppression of gas generation, and further allows suppression of manufacturing cost.

Figure 5:
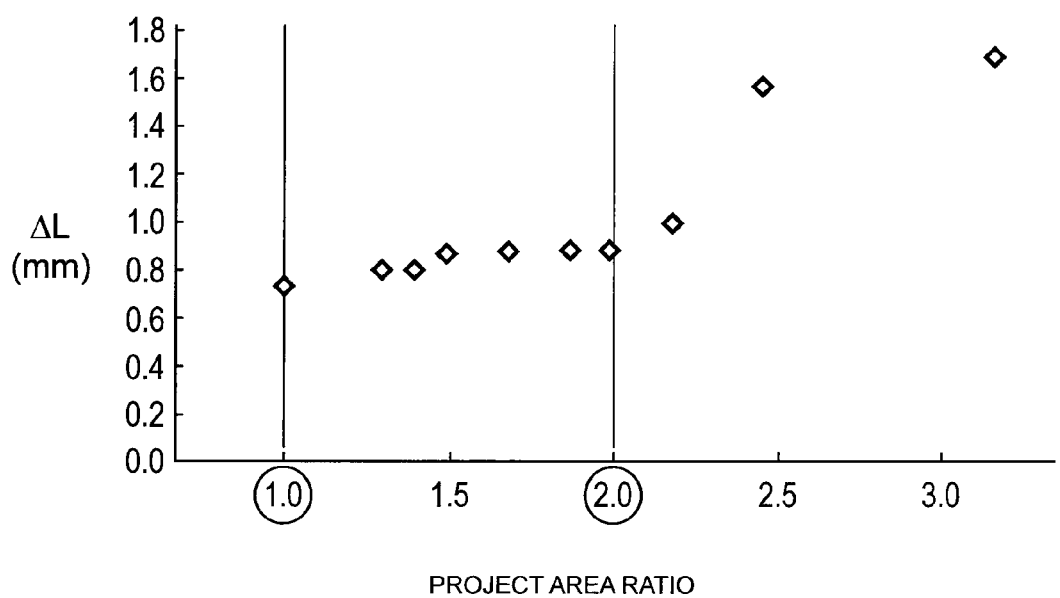
FIG. 5 is a graph comparing swollen amounts in a height direction of a case in the electric double-layer capacitor according to Embodiment 1 of the present invention.

FIG. 5 is a graph showing a relation between area ratios of polarizable-electrode-layer-removed section 6 and ΔL (mm), which is swollen amounts in a height direction of the case 8 as indications of gas generation inside the electric double-layer capacitor, when the project area of project section 2a as the portion where lead wire 2 is connected with cathode electrode 10 is set to 1.

A test method in FIG. 5 is as follows: when the project area of project section 2a as the portion where lead wire 2 is connected with cathode electrode 10 is set to 1, the electric double-layer capacitors with the respective area ratios of polarizable-electrode-layer-removed section 6 having been changed are held for 250 hours in the condition of being applied with 2.7 V in an atmosphere of 85° C., and then taken out and discharged, and thereafter, heights thereof are measured and compared with a height in the initial state to calculate ΔL (mm). The initial height is 30 mm, and when ΔL exceeds approximately 1.5 mm, a safe valve of case 8 is activated to come into an open state, and becomes unusable. These tests are conducted with the number of samples "n" being 30, and an average value thereof is expressed in the graph.

In FIG. 5, ΔL increases to a large degree when the project area ratio exceeds 2.0. This is because, in the anode electrode in the electric double-layer capacitor with the project area ratio exceeding 2.0, the area of the anode not opposed to polarizable electrode layer 4 increases, to induce gas generation. Therefore, setting this project area ratio to not larger than 2.0 allows suppression of gas generation.

It is to be noted that at this time, when the width of project section 2a of lead wire 2 in FIG. 3B is set to 1, setting the width of polarizable-electrode-layer-removed section 6 in FIG. 3A to not larger than 1.8 also allows exertion of the effect of suppressing gas generation.

Embodiment 2

In the following, Embodiment 2 of the present invention is described with reference to FIG. 6.

Figure 6:
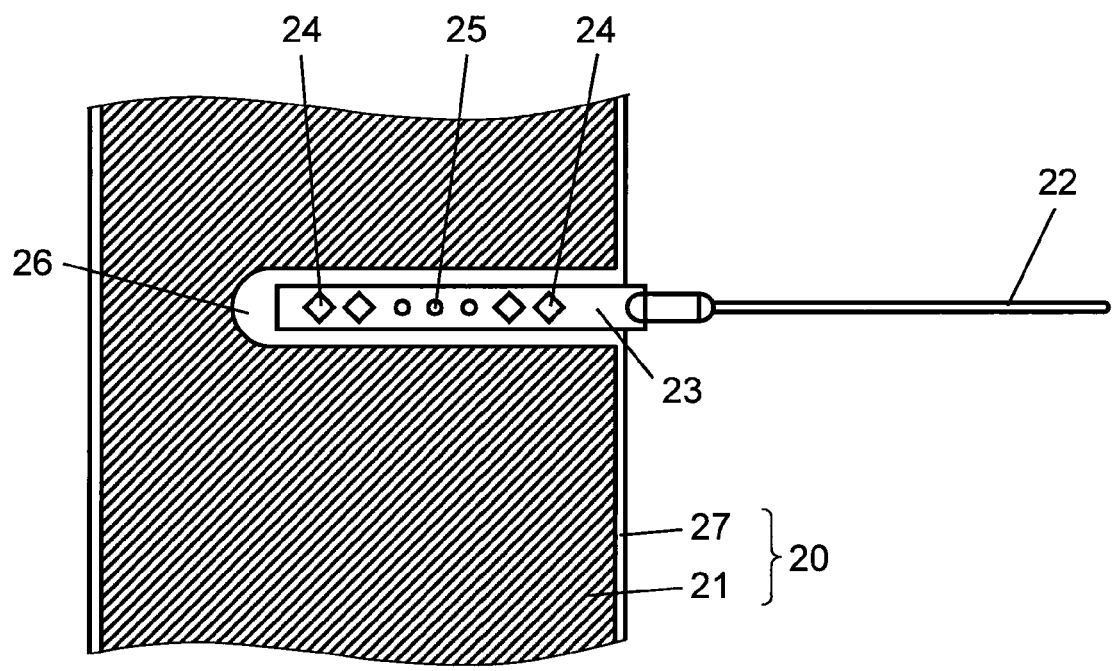
FIG. 6 is a partial plan view showing a contact between a lead wire and a current collector in Embodiment 2 of the present invention.

FIG. 6 is a partial plan view at the time when lead wire 22 is brought into contact with current collector 27 in Embodiment 2 of the present invention in a different manner from above Embodiment 1.

In FIG. 6, for connecting lead wire 22 to each of polarizable electrode layers 21 formed on both sides of current collector 27 made of metallic foil such as aluminum constituting the electrode, polarizable electrode layer 21 in a fixed position of lead wire 22 in flat section 23 is scraped away, and polarizable-electrode-layer-removed section 26 is provided. Thereafter, caulking joints 24 are formed at four points in polarizable-electrode-layer-removed section 26 and flat section 23 of lead wire 22 (two points on the end sides of electrode 20, and two points inside). Further, pressure welding joints 25 are formed at three points on a straight line connecting the caulking joints 24 at both ends, to joint current collector 27 with lead wire 22.

With such a configuration, joint with high strength can be obtained by caulking joints 24 provided at the two points each at both ends of flat section 23 of lead wire 22, and stable connection with a low resistance value can be obtained by pressure welding joints 25 provided at the three points on the straight line connecting the both ends of the caulking joints 24. Further, such joint can also deal with a small-sized article, which has been difficult for conventional caulking joint.

It is to be noted that the number of and places for formation of caulking joints and pressure welding joints in Embodiment 2 are not restricted to the above, and although the same effect can be obtained so long as current collector 27 is jointed to flat section 23 of the lead wire by the caulking joint and the pressure welding joint, it is desirable that the joint be formed at least by caulking joints at more than one point and a plurality of welding joints.

Embodiment 3

In the following, the present invention is described with reference to Embodiment 3, but the present invention is not restricted to this embodiment. Further, since a configuration of an electric double-layer capacitor is the same as described in Embodiment 1 with reference to FIG. 1, a description thereof is omitted here.

Figure 7A:
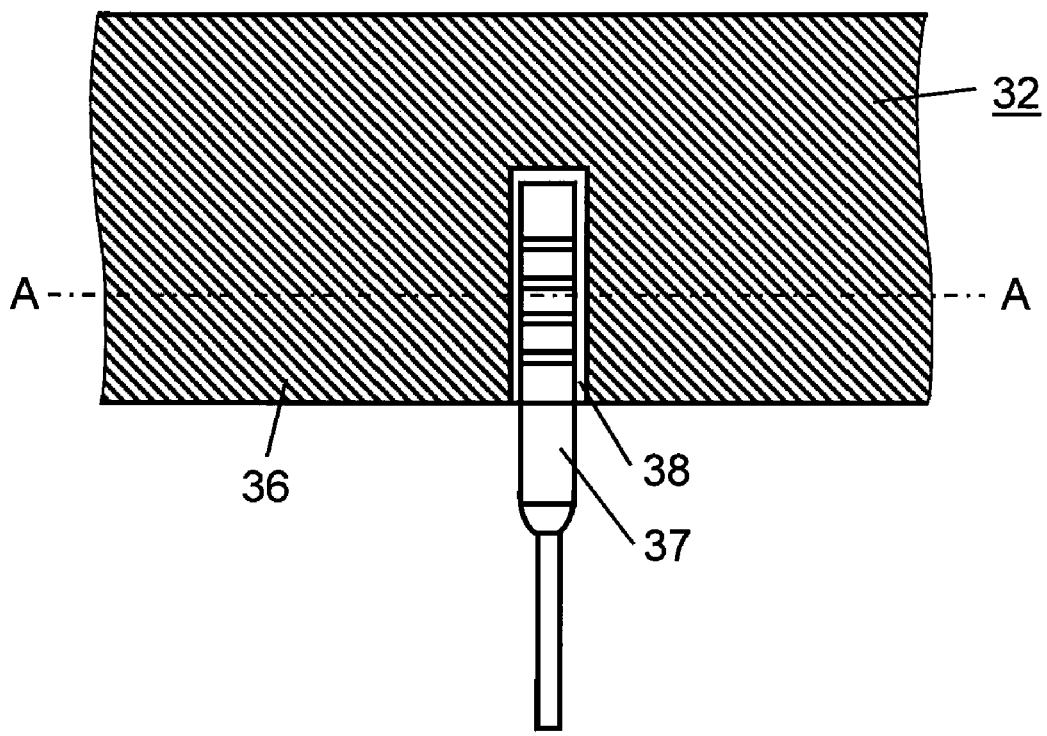
FIG. 7A is a substantial-part plan view showing a configuration of an anode electrode used in the same capacitor element.
Figure 7B:
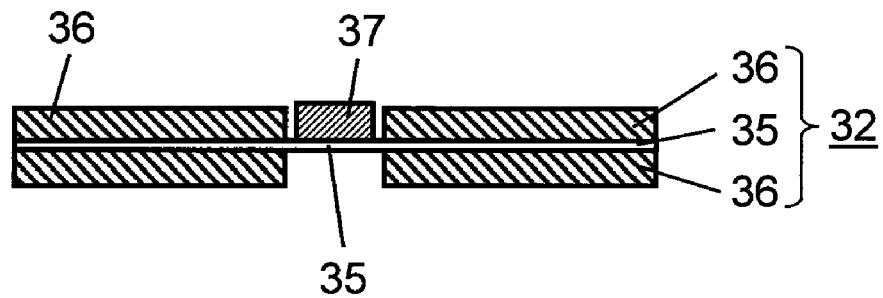
FIG. 7B is a sectional view of a line A-A of the same.

FIG. 7A is a substantial-part plan view showing a configuration of anode electrode 32 used in the same capacitor element 31, and FIG. 7B is a sectional view of a line A-A of the same.

In FIGS. 7A and 7B, part of polarizable-electrode-layer-removed section 36 formed in anode electrode 32 (the same applies to a polarizable electrode layer formed in a cathode electrode) is removed to expose current collector 35, and to this portion where current collector 35 is exposed, anode lead wire 37 is connected by means of caulking joint and/or pressure welding joint, ultrasonic welding, etc. This removal of polarizable-electrode-layer-removed section 36 is conducted by removing an area one time to twice as large as an area of the connected portion of anode lead wire 37 connected to the removed portion (a detail thereof is described later).

The capacitor element as thus configured is then mounted with rubber-made sealing member 7 (not shown) with lead wire 2 inserted through holes provided in sealing member 7. This capacitor element 1 is impregnated with a driving electrolyte (not shown) and thereafter inserted into bottomed-cylindrical case 8 (not shown) and concurrently, sealing member 7 is provided at the opening of case 8, which is drawn and curled, to seal case 8 through sealing member 7.

In the electric double-layer capacitor according to present Embodiment 3 as thus configured, polarizable electrode layer 4 with the minimum required area is removed and the lead wire on the cathode side is connected thereto so that an unnecessary exposed portion of the polarizable-electrode-layer-removed section can be made extremely small. Hence there can be extremely few cases where $BF_4^-$, $PF_6^-$ and the like as electrolytic anions generated in the exposed portion of the polarizable-electrode-layer-removed section of cathode electrode 10 are concentrated on the anode side to be acidified. This allows suppression of deterioration in separator 5 and thereby allows suppression of gas generation which occurs through electrochemical reaction, an increase in resistance and a decrease in capacitance, so that an electric double-layer capacitor with small characteristic deterioration and high reliability can be stably manufactured.

Figure 8:
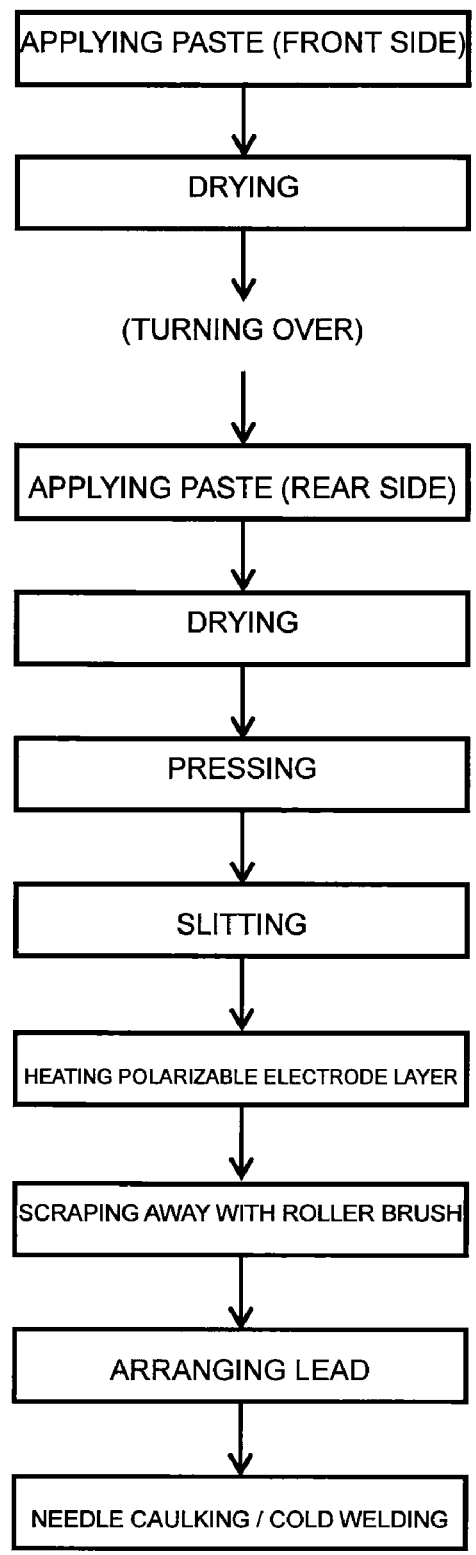
FIG. 8 is a manufacturing process diagram showing a manufacturing method of producing the same anode (cathode) electrode.
Figure 9:
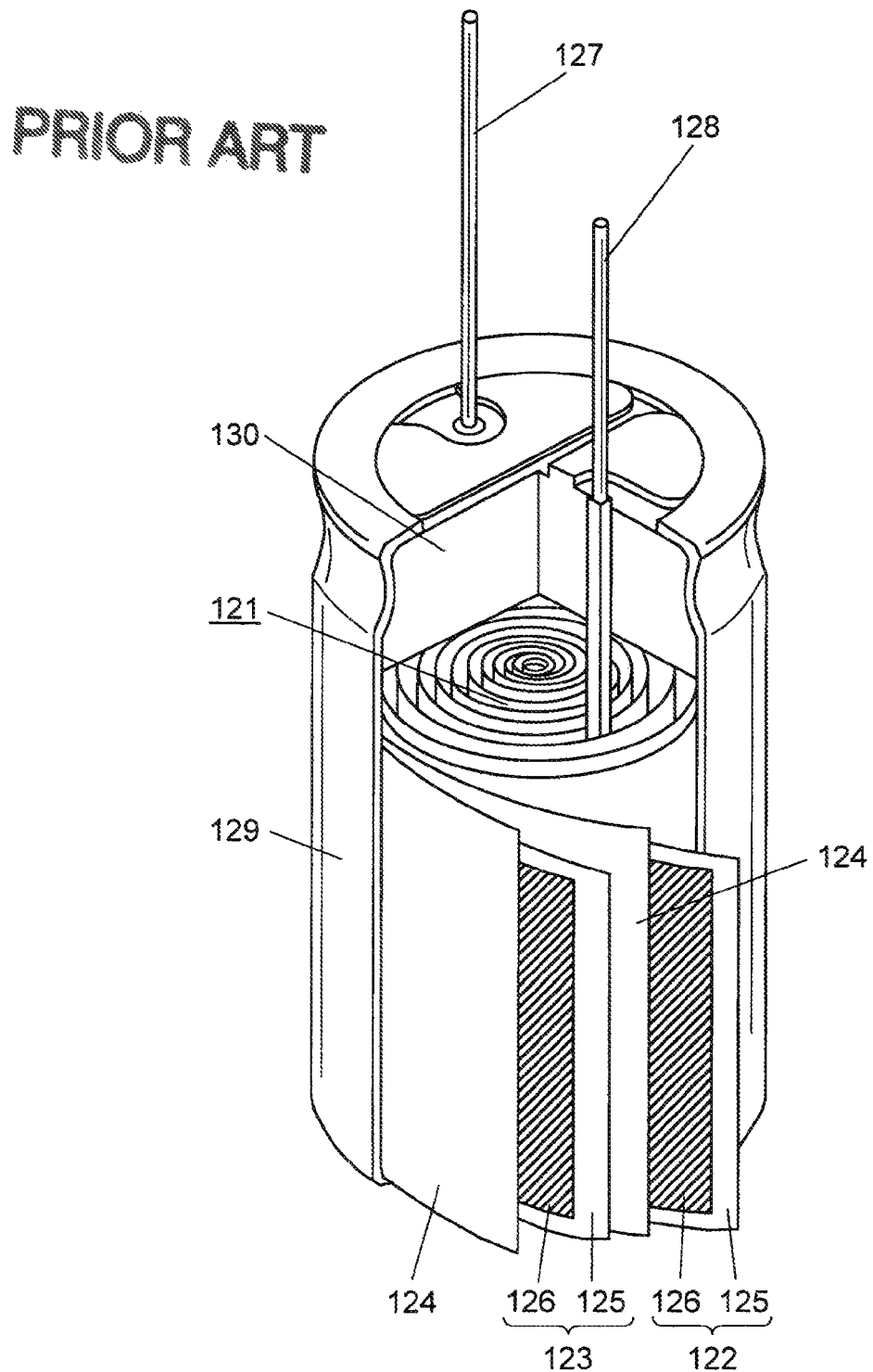
FIG. 9 is a partially broken away perspective view showing a configuration of a conventional electric double-layer capacitor.

FIG. 8 is a manufacturing process diagram showing a manufacturing method of producing anode electrode 9 and cathode electrode 10, and in the following, specific examples are described with reference to FIG. 8.

EXAMPLE 1

A high purity metallic foil (Al: 99.99% or higher) having a thickness of 30 μm is used as the current collector made of metallic foil, and the metallic foil is subjected to electrolytic etching in a hydrochloric acid based etching solution, to roughen the metallic foil surface.

Next, after the polarizable electrode layer is formed on one-side surface of this metallic foil, the metallic foil is turned over and the polarizable electrode layer is then formed in the same manner on the other-side surface, thereby to give an anode electrode with the polarizable electrode layers formed on the both sides of the metallic foil (the same applies to a cathode electrode).

In formation of this polarizable electrode layer, a phenol resin activated carbon powder having an average grain size of 5 μm, carbon black having an average grain size of 0.05 μm as a conductivity imparting agent, and a water-soluble binder solution with CMC (carboxymethyl cellulose) solved therein are mixed at a weight ratio of 10:2:1, and sufficiently kneaded with a kneader, and thereafter, the kneaded matter is added by degrees with a dispersion solution of methanol and further kneaded, to produce a paste having prescribed viscosity. This paste is then applied on the surface of the current collector, and dried in an atmosphere of 100° C. for an hour, to form the polarizable electrode layer.

Subsequently, for the purpose of attempting to increase a capacitance by density increase and planarization of the polarizable electrode layers formed on both sides, the polarizable electrode layers are pressed, and then slit into a desired width size.

Next, an anode lead wire (or a cathode lead wire) is connected to the anode electrode (or the cathode electrode) as thus produced. In this connection of each lead wire, first, a metal plate having been formed into substantially the same shape as the lead wire connected portion and heated at 280° C. is pressed onto the polarizable electrode layer formed on the surface of the current collector for a second, to scatter binder components in the polarizable electrode layer. It is to be noted that, although 260° C., which is the pyrolysis temperature of CMC, would be sufficiently high only for scattering the binder components, the temperature is set to 280° C. so as to scatter the component in a second with mass production taken into consideration. Thereafter, this heated portion of the polarizable electrode layer is mechanically scraped away by use of a rotating blush, and lead wire is provided to a portion where the polarizable electrode layer has been removed, and then connected by caulking joint and/or pressure welding joint.

Further, although only the polarizable electrode layer on one side, to which the lead wire is connected, may be removed, since removing the polarizable electrode layers on both sides allows further improvement in reliability of connection and reduction in resistance component, it can be said that removing the layers on both sides is more preferred.

It should be noted that removal of the polarizable electrode layer is conducted by removing an area one time to twice as large as an area of the connected portion of the lead wire connected to the removed portion. In a case of this removed area exceeding twice as large, the exposed portion of the current collector is too large, and hence, when a high voltage is applied to use the capacitor for a long period of time, the driving electrolyte reacts between the exposed portion of the current collector of the cathode electrode and the polarizable electrode layer of the anode electrode which is opposed to the exposed portion through the separator, and electrolytic anions $BF_4^-$, $PF_6^-$ and the like are then drawn to the anode side, to acidify the peripheral portion thereof, thereby causing deterioration in separator. Further, in addition to deterioration in characteristic, gas generation and an increase in inner pressure occur, and hence this case is not preferred. Or, on the contrary, in a case of the area of the removed portion being smaller than the area of the lead wire connected portion, part of the polarizable electrode layer comes into contact with the lead wire to cause occurrence of a contact defect and an increase in resistance, and hence this case is not preferred.

Next, the anode electrode and the cathode electrode as thus produced are wound in a state where a separator having a thickness of 35 μm is interposed therebetween, to give a capacitor element.

Subsequently, this capacitor element is impregnated with a driving electrolyte. As this driving electrolyte, a solution prepared by dissolving tetraethylammonium boron tetrafluoride in propylene carbonate is used.

Thereafter, this capacitor element is inserted into a bottomed cylindrical aluminum-made case, and an opening of this case is sealed by use of a rubber-made sealing member, so as to produce an electric double-layer capacitor according to the present embodiment (capacitor size: φ20×45 mm).

EXAMPLE 2

In Example 1 above, when part of the polarizable electrode layer is removed, the operation of scattering the binder components in the polarizable electrode layer by use of the heat metal plate is not performed. Except for that, an electric double-layer capacitor is produced in the same manner as in Example 1.

COMPARATIVE EXAMPLE 1

In Example 1 above, the removed area of a portion where part of the polarizable electrode layer is removed is set to twice and half as large as the area of the lead wire connected portion, and further, the operation of scattering the binder components in the polarizable electrode layer by use of the heat metal plate is not performed. Except for that, an electric double-layer capacitor is produced in the same manner as in Example 1.

As for the electric double-layer capacitors of Examples 1 and 2 and Comparative Example 1 as thus obtained, Table 1 shows initial characteristics [capacitance, direct current resistance (hereinafter abbreviated as DCR)] of those capacitors and results of characteristic deterioration tests conducted on those capacitors with 2.7 V applied thereto at 85° C. It is to be noted that the number of test samples is 20 and an average value thereof is shown. Further, the above DCR is discharged after charged, and an inclination between 0.5 to 2.0 seconds after the start of the discharge is calculated.

[Table 1]

As apparent from Table 1, it is found that the electric double-layer capacitor according to the present invention has a small capacitance change as compared with that of Comparative Example 1, and is capable of significantly improving ΔC, ΔDCR and the product swelling according to the characteristic deterioration test, and that effect is large particularly in Example 1.

As thus described, a method for manufacturing the electric double-layer capacitor according to the present invention is performed such that, when part of each of the polarizable electrode layers formed on both sides of the current collector is removed and the lead wire is connected thereto, the heat metal plate is pressed onto the portion where the polarizable electrode layer has been removed to scatter the binder components in the polarizable electrode layer, and thereafter, the portion is mechanically scraped. Further, as the area of part of the polarizable electrode layer to be removed, the area is removed which is one time to twice as large as the area of the connected portion of the lead wire that is connected to the removed portion. This method allows extremely easy and accurate removal of the polarizable electrode layer. Hence it is possible to remove only the polarizable electrode layer with the minimum required area and then connect the lead wire, so as to make an unnecessary exposed portion of the current collector extremely small and thus suppress deterioration in separator. It is thereby possible to suppress gas generation which occurs through an electrochemical reaction, an increase in resistance and a decrease in capacitance, so as to stably manufacture a highly reliable electric double-layer capacitor with small characteristic deterioration.

INDUSTRIAL AVAILABILITY

As thus described, according to the electric double-layer capacitor of the present invention, it is possible to suppress gas generation, so as to reduce resistance and improve reliability of the capacitor. Consequently, the present invention is useful for an automobile system and the like where high reliability is required with a large current and at a low temperature.

Further, the method for manufacturing an electric double-layer capacitor according to the present invention is small in deterioration in characteristic of the polarizable electrode layer, excellent in reliability, and is thus useful especially in manufacturing an in-vehicle electric double-layer capacitor.

TABLE 1

|  | INITIAL CHARACTERISTIC | | CHARACTERISTIC DETERIORATION (85° C., 2.7 V, after 150 h) | | PRODUCT |
|---|---|---|---|---|---|
|  | CAPACITANCE (F) | OCR (mΩ) | ΔC | ΔDCR | SWELLING (mm) |
| EXAMPLE 1 | 70 | 20 | −5% | 1.2 times | 0.3 |
| EXAMPLE 2 | 70 | 30 | −20% | 2.0 times | 0.5 |
| COMPARATIVE EXAMPLE 1 | 65 | 30 | −80% | 10.0 times | 1.6 |

The invention claimed is:

1. An electric double-layer capacitor comprising:
a capacitor element;
a driving electrolyte; and
a case,
wherein the capacitor element is housed in the case, together with the driving electrolyte,
polarizable electrode layers are formed on both sides of a current collector made of metallic foil,
anode electrode and cathode electrode, which are attached to lead wires, are paired,
current collectors are wound by interposing a separator between the pair of the anode electrode and the cathode electrode in such a manner that the polarizable electrode layers are faced each other,
the lead wire is fixed to a polarizable-electrode-layer-removed section where the polarizable electrode layer on the electrode has been removed, and
an area of the polarizable-electrode-layer-removed section is not smaller than 1 and not larger than 2.0 when a project area of a portion where the lead wire is connected with the current collector is set to 1.

2. The electric double-layer capacitor according to claim 1, wherein a length of the polarizable-electrode-layer-removed section is shorter than a width of the current collector.

3. The electric double-layer capacitor according to claim 1, wherein the separator is made of cellulose.

4. The electric double-layer capacitor according to claim 1, wherein the lead wire has at least two or more of caulking joints and a plurality of pressure welding joints in the portion where the lead wire is connected with the current collector.

5. A method for manufacturing an electric double-layer capacitor, comprising:
forming polarizable electrode layers on both sides of a current collector made of metallic foil and connecting lead wires to the current collector, to produce an anode electrode;
producing a cathode electrode in the same manner;
winding the anode electrode and the cathode electrode in a state where a separator is interposed therebetween, to produce a capacitor element;
housing the capacitor element in a case together with a driving electrolyte; and
sealing an opening of the case with a sealing member,
wherein, as the steps of producing the anode electrode and the cathode electrode, after formation of the polarizable electrode layers on both sides of the current collector, part of the polarizable electrode layer is removed, and the lead wire is connected to the portion where part of the polarizable electrode layer has been removed.

6. The method for manufacturing an electric double-layer capacitor according to claim 5,
wherein the method of removing part of the polarizable electrode layer in the steps of producing the anode electrode and the cathode electrode is performed such that a heat metal plate in shape corresponding to a shape of the removed portion is pressed onto the polarizable electrode layer and heated, to scatter binder components in the polarizable electrode layer, and thereafter, the polarizable electrode layer in the heated portion is mechanically scraped away by use of a rotating brush.

7. The method for manufacturing an electric double-layer capacitor according to claim 5, wherein the method of removing part of the polarizable electrode layer in the steps of producing the anode electrode and the cathode electrode is performed such that an area of the polarizable electrode layer is removed one time to twice as large as an area of a connected portion of the lead wire to be connected to the removed portion.

* * * * *